US012106529B2

(12) United States Patent
Yamasaki et al.

(10) Patent No.: US 12,106,529 B2
(45) Date of Patent: Oct. 1, 2024

(54) IMAGING APPARATUS

(71) Applicant: Panasonic Intellectual Property Management Co., Ltd., Osaka (JP)

(72) Inventors: Takaaki Yamasaki, Osaka (JP); Shinichi Yamamoto, Osaka (JP); Wataru Okamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 108 days.

(21) Appl. No.: 18/109,929

(22) Filed: Feb. 15, 2023

(65) Prior Publication Data
US 2023/0326163 A1    Oct. 12, 2023

(30) Foreign Application Priority Data

Apr. 6, 2022   (JP) .................................. 2022-063494

(51) Int. Cl.
| | |
|---|---|
| *G06V 10/141* | (2022.01) |
| *G06T 7/11* | (2017.01) |
| *G06T 7/50* | (2017.01) |
| *G06V 10/147* | (2022.01) |
| *G06V 10/25* | (2022.01) |

(Continued)

(52) U.S. Cl.
CPC .............. *G06V 10/141* (2022.01); *G06T 7/11* (2017.01); *G06T 7/50* (2017.01); *G06V 10/25* (2022.01); *G06V 10/60* (2022.01); *G06T 2207/10024* (2013.01); *G06T 2207/10152* (2013.01)

(58) Field of Classification Search
CPC ...... G06V 10/141; G06V 10/25; G06V 10/60; G06V 10/147; G06V 10/235; G06V 10/26; G06V 10/44; G06V 20/20; G06T 7/50; G06T 7/11; G06T 2207/10152;

(Continued)

(56) References Cited

U.S. PATENT DOCUMENTS

| | | | |
|---|---|---|---|
| 9,488,598 B2* | 11/2016 | Kim .................. | G01N 21/8422 |
| 2013/0002664 A1* | 1/2013 | Mihara .................. | G06T 15/00 |
| | | | 345/419 |

(Continued)

FOREIGN PATENT DOCUMENTS

| | | |
|---|---|---|
| JP | 2016-015599 A | 1/2016 |
| JP | 2019-068402 A | 4/2019 |
| WO | 2019/172437 A1 | 9/2019 |

*Primary Examiner* — Marly S Camargo
(74) *Attorney, Agent, or Firm* — Renner, Otto, Boisselle & Sklar, LLP

(57) ABSTRACT

An imaging apparatus includes: an image sensor that captures a subject image by receiving incident light, to generate image data; a controller that controls an image shooting operation using the image sensor; a recorder that records the image data as a result of the image shooting operation; and an adjuster that adjusts a light reception rate in each position on an incident surface, the light reception rate allowing the image sensor to receive the light, the incident surface being entered by the light corresponding to an image represented by the image data. The controller controls the adjuster to render the light reception rate in a position corresponding to part of the image on the incident surface different from the light reception rate in another position thereon, and causes the image sensor to capture the image with the light reception rate rendered different by the adjuster in the image shooting operation.

11 Claims, 12 Drawing Sheets

(51) Int. Cl.
*G06V 10/60* (2022.01)
*H04N 23/63* (2023.01)
*H04N 23/75* (2023.01)

(58) Field of Classification Search
CPC ........ G06T 2207/10024; H04N 23/631; H04N 23/633; H04N 23/75
See application file for complete search history.

(56) References Cited

U.S. PATENT DOCUMENTS

| | | | |
|---|---|---|---|
| 2018/0098224 A1 | 4/2018 | Sun et al. | |
| 2019/0098224 A1* | 3/2019 | Kobayashi | H04N 23/11 |
| 2020/0404139 A1 | 12/2020 | Masuda et al. | |
| 2022/0184733 A1* | 6/2022 | Mori | H01L 21/683 |
| 2023/0394787 A1* | 12/2023 | Yamazaki | G06V 10/14 |

* cited by examiner

IMAGING APPARATUS

BACKGROUND

1. Technical Field

The present disclosure relates to an imaging apparatus capable of adjusting a ratio with which light for capturing a subject image is received.

2. Related Art

WO 2019/172437 A discloses a digital camera including a variable neutral density (ND) filter. The variable ND filter is an optical element for controlling the amount of light incident on the imaging element, and enables the transmittance of light to be partially changed. The digital camera of WO 2019/172437 A uses a variable ND filter in order to obtain a plurality of pixel signal groups of different brightness by means of one instance of photometric imaging, while returning the transmittance of the entire variable ND filter to 100% when an imaging instruction is given by pressing a release button, for example.

SUMMARY

The present disclosure provides an imaging apparatus that enables brightness in an image shot to be easily adjusted.

An imaging apparatus according to the present disclosure includes: an image sensor that captures a subject image by receiving incident light, to generate image data; a controller that controls an image shooting operation using the image sensor; a recorder that records the image data on a recording medium as a result of the image shooting operation; and an adjuster that adjusts a light reception rate in each position on an incident surface, the light reception rate allowing the image sensor to receive the light, the incident surface being entered by the light corresponding to an image represented by the image data, wherein the controller controls the adjuster to render the light reception rate in a position corresponding to part of the image on the incident surface different from the light reception rate in another position thereon, and causes the image sensor to capture the image with the light reception rate being rendered different by the adjuster in the image shooting operation, thus causing the recorder to record image data representing the image.

The imaging apparatus of the present disclosure enables brightness in an image shot to be easily adjusted.

DETAILED DESCRIPTION

An embodiment will be described in detail hereinbelow with reference to the drawings as appropriate. However, a detailed description exceeding requirements may be omitted. It should be noted that the accompanying drawings and the following description are provided for a person skilled in the art to fully understand the present disclosure. Thus, the drawings and the description are not intended to limit the subject matter defined in the patent claims.

First Embodiment

In a first embodiment, a digital camera, which serves as an example of the imaging apparatus according to the present disclosure, will be described.

1. Configuration

A configuration of a digital camera according to the first embodiment will be described using FIGS. 1 and 2.

Figure 1:
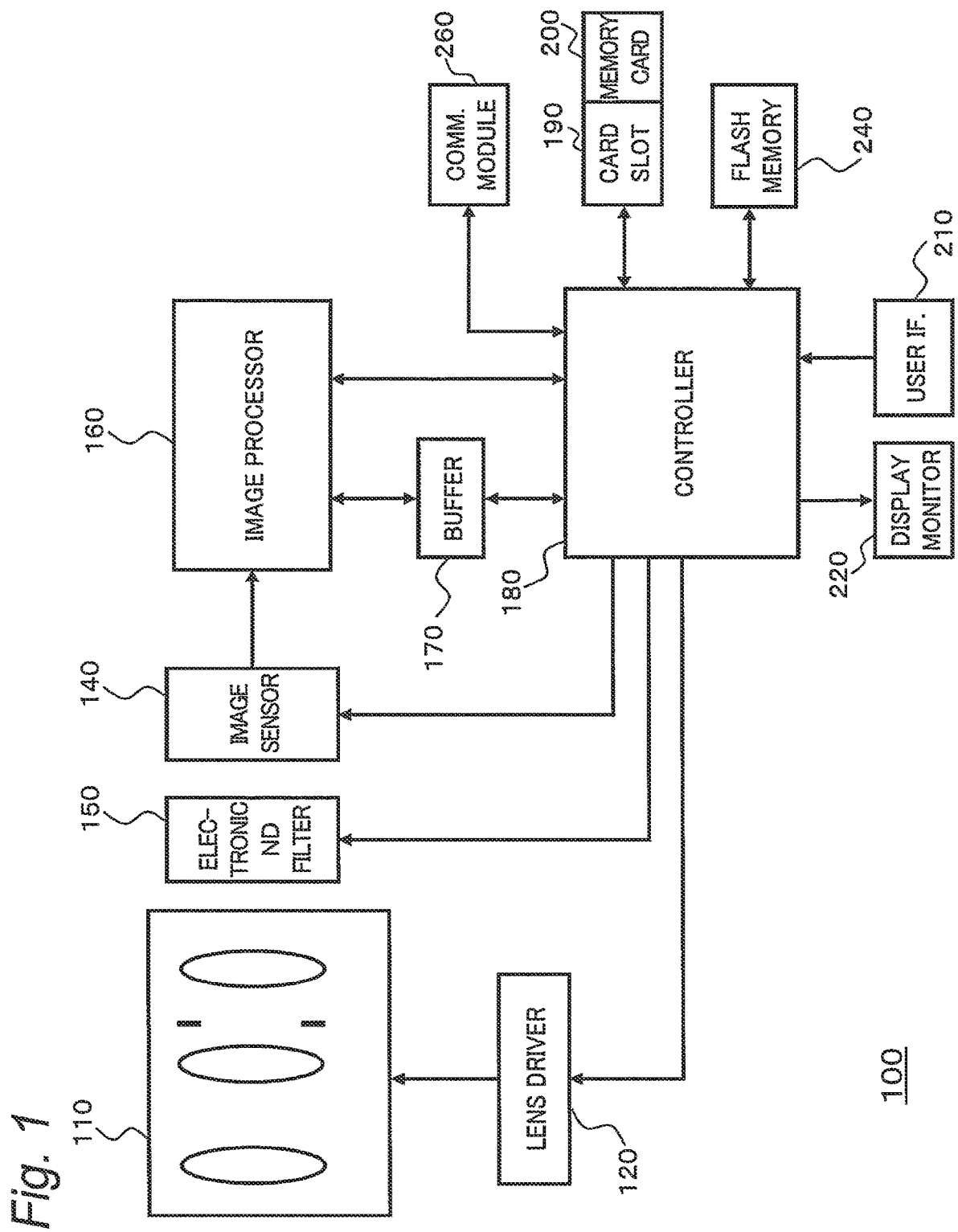
FIG. 1 is a diagram showing a configuration of a digital camera according to a first embodiment of the present disclosure.

FIG. 1 is a diagram showing a configuration of a digital camera 100 according to the present embodiment. The digital camera 100 according to the present embodiment includes an optical system 110, a lens driver 120, an image sensor 140, and an electronic N-D (neutral density) filter 150. The digital camera 100 further includes an image processor 160, a buffer memory 170, a controller 180, a user interface 210, and a display monitor 220. The digital camera 100 also includes a flash memory 240, a card slot 190, and a communication module 260.

The optical system 110 includes a zoom lens, a focus lens, a diaphragm, and the like. The zoom lens is a lens for changing the magnification of the subject image formed by the optical system. The focus lens is a lens for changing the focus state of the subject image formed on the image sensor 140. The zoom lens and the focus lens are formed of one or more lenses.

The lens driver 120 includes a configuration for driving various lenses of the optical system 110 such as a focus lens. For example, the lens driver 120 includes a motor and moves the focus lens along the optical axis of the optical system 110, based on control by the controller 180. The configuration for driving the focus lens in the lens driver 120 can be implemented by a DC motor, a stepping motor, a servo motor, an ultrasonic motor, or the like.

The image sensor 140 captures a subject image incident through the optical system 110 and generates image data. The image data generated by the image sensor 140 is inputted to the image processor 160.

The image sensor 140 generates image data of a new frame at a predetermined frame rate (for example, 30 frames/second). The imaging data generation timing and electronic shutter operation of the image sensor 140 are controlled by the controller 180. As the image sensor 140, various image sensors such as a CMOS image sensor, a CCD image sensor, or an NMOS image sensor can be used.

The image sensor 140 executes an imaging operation of a moving image or a still image, an imaging operation of a through image, and the like. The through image is mainly a moving image, and is displayed on the display monitor 220 for the user to determine the composition. The image sensor 140 is an example of the image sensor according to the present embodiment.

The electronic ND filter 150 is a filter element in which the transmittance of light such as visible light can be changed by electronic control, and is configured from various physical elements such as a liquid-crystal element or an electrochromic element, for example. The electronic ND filter 150 is arranged, for example, between the optical system 110 and the image sensor 140. The electronic ND filter 150 according to the present embodiment is configured to be capable of changing the transmittance in each position of a predetermined unit on the incident surface whereon the light is incident. A configuration example of the electronic ND filter 150 according to the present embodiment is illustrated in FIG. 2.

Figure 2:
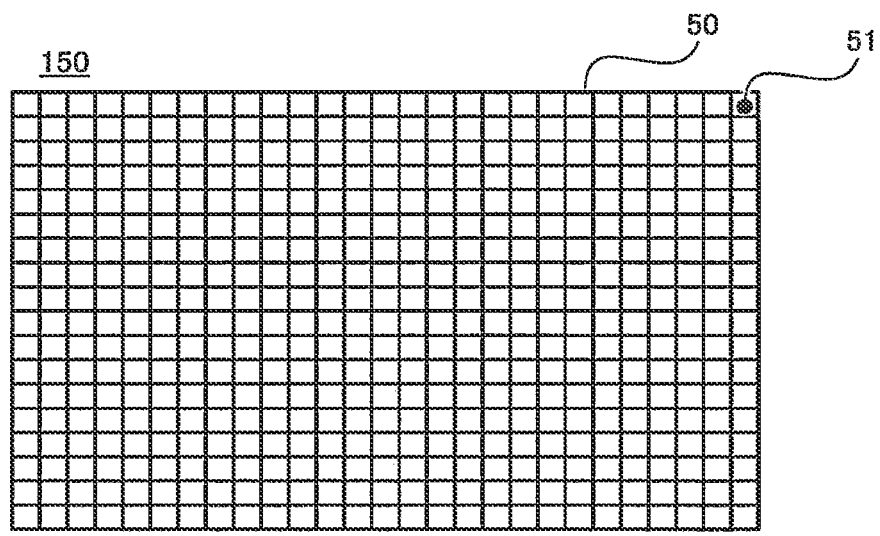
FIG. 2 is a diagram illustrating a configuration of an electronic ND filter in the digital camera according to the first embodiment.

As shown in FIG. 2, for example, the electronic ND filter 150 according to the present embodiment has an incident surface 50 whereon a plurality of pixels 51 is arranged in a two-dimensional array. The electronic ND filter 150 is positioned with respect to the image sensor 140 such that each pixel 51 of the electronic ND filter 150 on the incident surface 50 corresponds to a predetermined number (one or a plurality) of pixels on the imaging surface of the image sensor 140, via incident light from the optical system 110.

In the electronic ND filter 150 according to the present embodiment, a liquid-crystal element is sealed between a plurality of glass substrates. The electronic ND filter 150 is capable of independently adjusting the transmittance of incident light for each region (in each position) on the incident surface 50 in units of pixels 51 as region units. On the incident surface 50 of the electronic ND filter 150, a transparent electrode (not illustrated) corresponding to each region is arranged on a glass substrate so that the transmittance can be independently controlled for each region, and a drive circuit (not illustrated) is capable of independently adjusting the transmittance of each of the plurality of pixels 51 by setting a drive voltage for each region. The electronic ND filter 150 is an example of an adjuster that adjusts the transmittance, which serves as an example of the light reception rate.

Returning to FIG. 1, the image processor 160 performs predetermined processing on the image signal outputted from the image sensor 140 to generate image data, or performs various processing on the image data to generate an image to be displayed on the display monitor 220. The predetermined processing includes white balance correction, gamma correction, YC conversion processing, electronic zoom processing, compression processing, expansion processing, and the like, but is not limited to such processing. The image processor 160 may include a hard-wired electronic circuit, or may include a microcomputer, a processor, or the like, which uses a program.

The buffer memory 170 is a recording medium that functions as a work memory for the image processor 160 and the controller 180. The buffer memory 170 is implemented with a dynamic random-access memory (DRAM) or the like. The flash memory 240 is a non-volatile recording medium. Each of the memories 170 and 240 is an example of a storage unit according to the present embodiment.

The controller 180 controls the overall operation of the digital camera 100. The controller 180 uses the buffer memory 170 as a work memory during a control operation and an image processing operation.

The controller 180 includes a CPU or an MPU, and the CPU or MPU achieves a predetermined function by executing a program (software). The controller 180 may include a processor including a dedicated electronic circuit designed to achieve a predetermined function instead of the CPU or the like. That is, the controller 180 can be implemented with various processors such as a CPU, an MPU, a GPU, a DSU, an FPGA, and an ASIC. The controller 180 may include one or more processors.

The card slot 190 enables the memory card 200 to be installed, and accesses the memory card 200 based on the control by the controller 180. The digital camera 100 is capable of recording image data on the memory card 200 and of reading the recorded image data from the memory card 200.

The user interface 210 is a generic term for operation members that receive an operation (instruction) from a user. The user interface 210 includes buttons, levers, dials, touch panels, joysticks, switches, and the like that receive user operations, and includes, for example, direction keys, an enter button, a shutter button, a moving image recording button, a function button, and the like. Furthermore, the user interface 210 may also include a virtual button or an icon displayed on the display monitor 220, or the like.

The display monitor 220 is an example of a display unit that displays various types of information. For example, the display monitor 220 displays an image (a through image) represented by image data captured by the image sensor 140 and subjected to image processing by the image processor 160. Further, the display monitor 220 displays a menu screen or the like for the user to perform various settings on the digital camera 100. The display monitor 220 can include, for example, a liquid-crystal display device or an organic EL device.

The communication module 260 is a module (circuit) that performs communication conforming to the communication standard IEEE 802.11 or a Wi-Fi standard, or the like. The digital camera 100 may communicate directly with other devices via the communication module 260 or may communicate via an access point. The communication module 260 may be connectable to a communication network such as the Internet.

2. Operation

The operation of the digital camera 100 configured as described above will be described hereinbelow. The digital camera 100 according to the present embodiment has a function for shooting an image partially dimmed by the electronic ND filter 150 in various shooting scenes desired by the user. An outline of the operation of the digital camera 100 will be described hereinbelow.

2-1. Outline of Operation

Figure 3A:
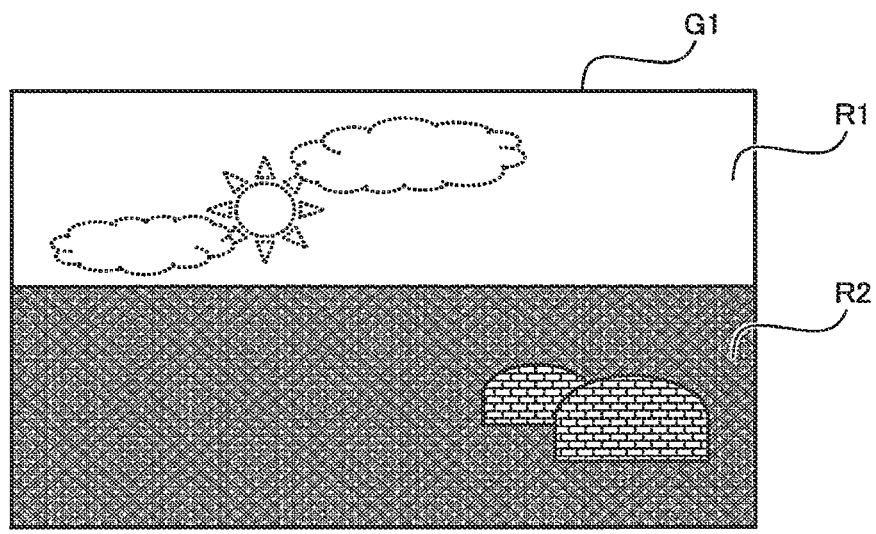
FIGS. 3A and 3B are diagrams to provide an outline of an operation of the digital camera according to the first embodiment.
Figure 3B:
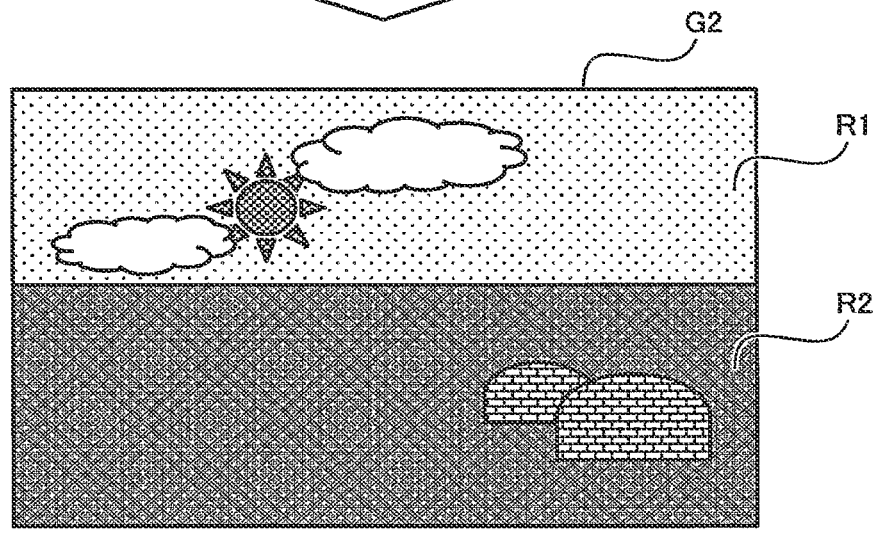

FIGS. 3A and 3B are diagrams to provide an outline of the operation of the digital camera 100 according to the present embodiment.

FIG. 3A illustrates a through image G1 as an example of a shooting scene in which overexposure has occurred. FIG. 3B illustrates a recorded image G2 of a shooting result of the shooting scene of FIG. 3A by the digital camera 100 according to the present embodiment.

The shooting scene illustrated in FIG. 3A includes a relatively bright region R1 (referred to hereinbelow as "bright region R1") and a relatively dark region R2 (referred to hereinbelow as "dark region R2") in a composition in which a landscape serving as a subject is divided into two with a horizontal line as a boundary. In the example of FIG. 3A, overexposure with excessive brightness occurs in this bright region R1 of the two-division composition, and the appearance of an unclear subject including blown-out highlights, or the like, is obtained.

As a conventional countermeasure in such a shooting scene, for example, exposure setting with which the exposure value is lowered until the bright region R1 is not overexposed may be considered. However, in such exposure setting, for example, in the dark region R2 of FIG. 3A, the exposure becomes underexposure with insufficient brightness, thus inducing an unclear appearance due to black crush or the like.

Therefore, in the digital camera 100 according to the present embodiment, the transmittance is controlled for each region by the electronic ND filter 150 so that, even in a shooting scene as per FIG. 3A, for example, a clear image can be shot for the entire image as shown in FIG. 3B.

For example, in the example of FIG. 3A, the digital camera 100 according to the present embodiment selectively decreases the transmittance of the portion corresponding to the bright region R1 in the electronic ND filter 150, and maintains the transmittance of the dark region R2. As a result, for example, as shown in FIGS. 3A and 3B, overexposure of the bright region R1 can be eliminated. At this time, the brightness of the dark region R2 is not particularly changed, and underexposure can be avoided. In this manner, a shooting result utilizing the dynamic range of the digital camera 100 can be obtained by suppressing excess or deficiency of exposure for the entire image.

The digital camera 100 according to the present embodiment performs various operations for facilitating image shooting using the electronic ND filter 150 as described above according to various use cases. Details of the operation of the digital camera 100 according to the present embodiment will be described hereinbelow.

2-2. Overall Operation

The overall operation when an image is shot using the electronic ND filter 150 as described above in the digital camera 100 according to the present embodiment will be described using FIGS. 4 and 5.

Figure 4:
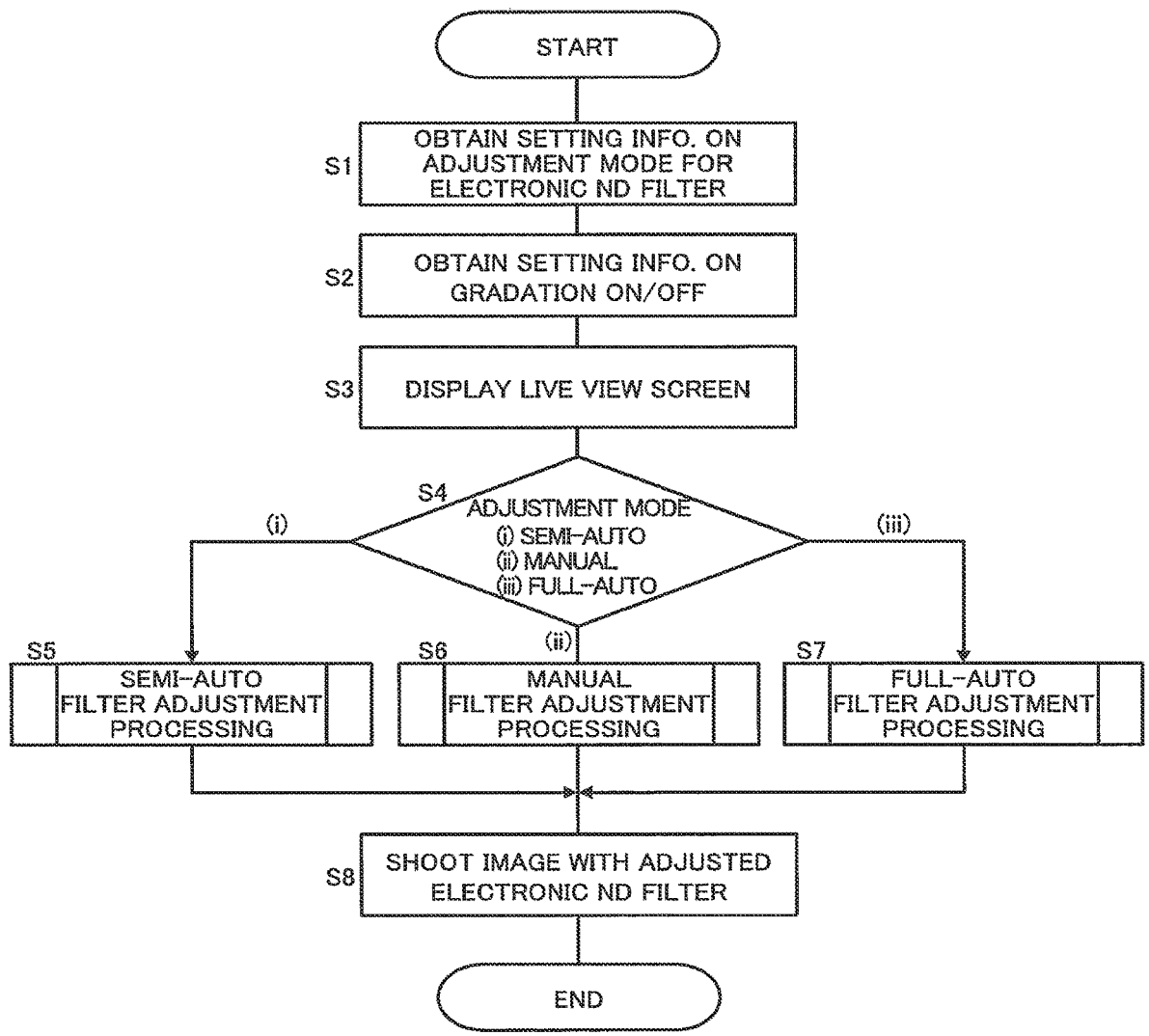
FIG. 4 is a flowchart to describe the overall operation of the digital camera according to the first embodiment.

FIG. 4 is a flowchart to describe the overall operation of the digital camera 100 according to the present embodiment. FIG. 5 shows a display example of a setting menu of the digital camera 100 according to the embodiment. The processing shown in the flowchart of FIG. 4 is started, for example, in a state where the setting menu illustrated in FIG. 5 is displayed on the display monitor 220, and is executed by the controller 180 of the digital camera 100.

Figure 5:
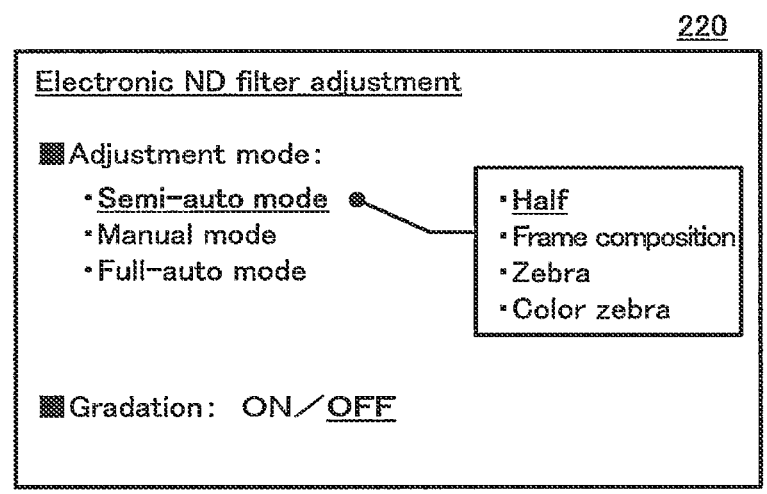
FIG. 5 is a diagram showing a display example of a setting menu of the digital camera according to the first embodiment.
Figure 6:
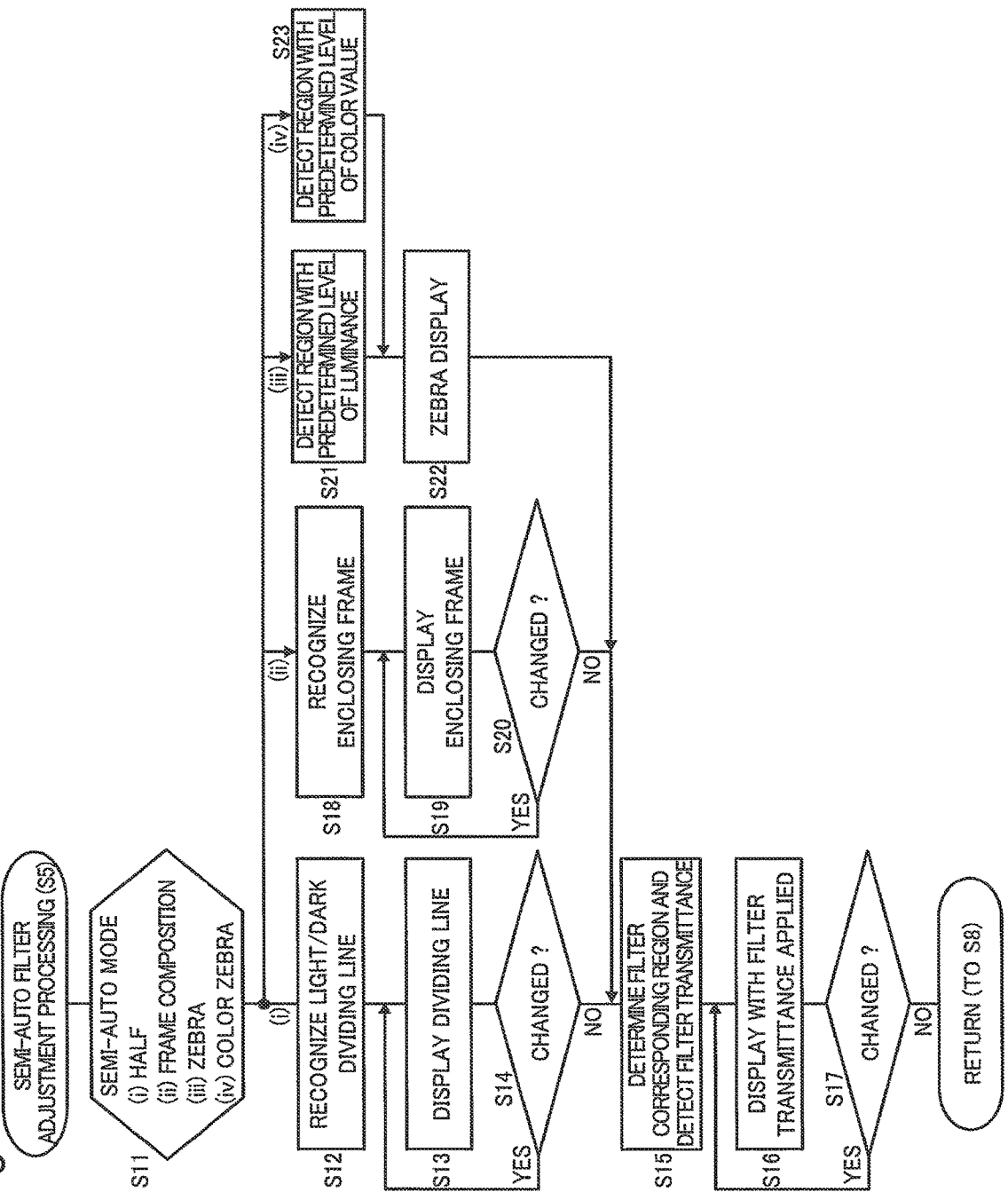
FIG. 6 is a flowchart illustrating semi-auto filter adjustment processing of the digital camera.

As shown in FIG. 5, for example, the digital camera 100 according to the present embodiment has various adjustment modes such as a semi-auto mode, a manual mode, and a full-auto mode. The adjustment modes are various operation modes in which the transmittance is automatically or manually adjusted in image shooting using the electronic ND filter 150 described above.

The semi-auto mode is an adjustment mode in which the digital camera 100 automatically adjusts the electronic ND filter 150 according to the composition and the like desired by the user, and prompts the user to perform fine-adjustment from that state. In the example of FIG. 5, the semi-auto mode includes, for example, a half mode for two-division composition (see FIG. 3), a frame composition mode, a zebra mode, a color zebra mode, and the like. Such various semi-auto modes will be described subsequently.

The manual mode is an adjustment mode in which the electronic ND filter 150 is manually adjusted in response to a user operation without performing automatic adjustment by the digital camera 100 in particular. Full-auto mode is an adjustment mode in which the digital camera 100 automatically adjusts the electronic ND filter 150 according to the situation of image shooting without any particular user operation.

For example, in step S1 of FIG. 4, the controller 180 receives a user operation relating to the adjustment mode of the electronic ND filter 150 in the user interface 210 in a state where the display monitor 220 is made to display the setting menu as illustrated in FIG. 5. In response to such a user operation, the controller 180 acquires setting information indicating a set adjustment mode of the electronic ND filter 150 (S1).

Further, the setting menu illustrated in FIG. 5 includes setting items regarding the necessity of gradation in the adjustment of the electronic ND filter 150. The setting items are set using ON/OFF to indicate, for example, whether or not to apply gradation to the transmittance between two regions R1 and R2 (FIG. 3A) in which the transmittances are separately set, that is, whether or not to gradually change the transmittance. For example, the controller 180 acquires setting information regarding the necessity of gradation according to user operation with respect to the setting item in the user interface 210, for example (S2).

The controller 180 displays a live view screen on the display monitor 220 in a state of acquiring the setting information for the electronic ND filter 150 as described above, for example (S3). In step S3, the electronic ND filter 150 is in an initial state, and the transmittance is set to an initial value such as 100% overall, for example. For example, the through image G1 illustrated in FIG. 3A in the examples of FIGS. 3A and 3B is displayed on the live view screen in step S3. The live view screen is an example of an operation screen for receiving a user operation by displaying the through image G1 in real time.

Furthermore, the controller 180 determines whether the set adjustment mode is any of (i) the semi-auto mode, (ii) the manual mode, and (iii) the full-auto mode on the basis of, for example, the setting information acquired as described above (S4). For example, in a state where the live view screen is displayed as described above, the controller 180 performs various processing to adjust the transmittance of each pixel 51 of the electronic ND filter 150 according to the various adjustment modes thus set (S5 to S7).

For example, in a case where the set adjustment mode is the semi-auto mode ((i) in S4), the controller 180 performs semi-auto filter adjustment processing (S5). In the filter adjustment processing (S5), a partial region (that is, a partial region) or the like in which transmittance is to be adjusted is detected according to the composition and so forth assumed in various semi-auto modes, and a fine-adjustment user operation with respect to the detection results is received. Details of the processing in step S5 will be described subsequently.

In a case where the set adjustment mode is the manual mode ((ii) in S4), the controller 180 performs manual filter adjustment processing (S6). In the filter adjustment processing (S6), the partial region desired by the user and the transmittance thereof are set in the electronic ND filter 150 according to the user operation. Details of the processing in step S6 will be described subsequently.

Further, in a case where the set adjustment mode is the full-auto mode ((iii) in S4), the controller 180 performs full-auto filter adjustment processing (S7). In the filter adjustment processing (S7), for example, the transmittance of each pixel 51 of the electronic ND filter 150 is automatically adjusted according to the brightness of each portion of a shooting scene. Details of the processing in step S7 will be described subsequently.

The controller 180 executes the image shooting operation by the digital camera 100 in a state where the electronic ND filter 150' is adjusted in the various filter adjustment processing (S5 to S7) as described above (S8). For example, in still image shooting, when detecting a user operation such as pressing of a shutter button in the user interface 210, the controller 180 causes the image sensor 140 to execute a still image capturing operation, and records the generated image data in the memory card 200 via the card slot 190. In step S8, a plurality of still images may be shot, or continuous shooting may be performed. Further, step S8 is not limited to still image shooting in particular, and may be moving image shooting.

According to the above overall operation, the digital camera 100 according to the present embodiment partially adjusts the transmittance in the electronic ND filter 150 automatically or in a setting according to a user operation (S5 to S7), and performs image shooting (S8). As a result, the electronic ND filter 150 can be appropriately adjusted in various shooting circumstances, and image shooting with reduced excess or deficiency of exposure can be easily performed.

Further, according to the gradation setting in step S2, for example, the digital camera 100 adjusts the transmittance so as to continuously change between the bright region R1 and the dark region R2 in the recorded image G2 in the example of FIG. 3B. As a result, for example, it is possible to easily perform the adjustment desired by the user such as that of enabling, with a natural impression, a change in brightness, using the electronic ND filter 150, in the recorded image G2 of the shooting result. The gradation setting information in step S2 is not limited only to necessity, and details such as the range, or the rate of change, with which gradation is applied, for example, can be set by the user.

2-2-1. Semi-Auto Filter Adjustment Processing

The semi-auto filter adjustment processing in step S5 of FIG. 4 will be described using FIGS. 6 to 9.

First, the controller 180 determines whether the set semi-auto mode is any of (i) the half mode, (ii) the frame composition mode, (iii) the zebra mode, and (iv) the color zebra mode based on, for example, the adjustment mode setting information acquired in step S1 of FIG. 4 (S11).

(1) Half Mode

Half mode is an adjustment mode in which the transmittances of the regions R1 and R2 are rendered different from each other so as to reduce the difference in brightness between the bright region R1 and the dark region R2 in the two-division composition as shown in FIG. 3, for example.

In a case where the set semi-auto adjustment mode is half mode ((i) in S11), the controller 180 recognizes, for example, a dividing line that defines two regions in the two-division composition on the through image G1 (S12). Next, the controller 180 displays the recognized dividing line on the live view screen of the display monitor 220 (S13). The display example in step S13 is shown in FIG. 7A.

Figure 7A:
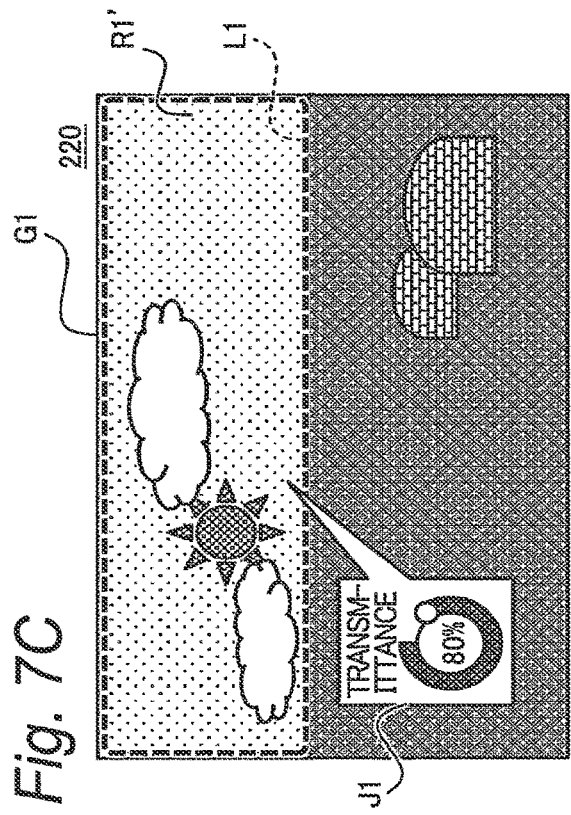
FIGS. 7A to 7D are diagrams to describe a half mode of the digital camera.

FIG. 7A illustrates the recognition result of step S12 of the through image G1 in FIG. 3A. For example, the controller 180 recognizes, through the image recognition of the through image G1, the horizontal line in the example of FIG. 3A as the dividing line L1 between the bright region R1 and the dark region R2 (S12). Through such recognition of the dividing line L1 (S12), the controller 180 is capable of detecting a partial region such as the bright region R1 or the dark region R2 having the dividing line L1 as a boundary.

For example, in step S12, the controller 180 detects, as the dividing line L1, a straight line extending in a predetermined direction so as to divide the through image G1, through image recognition such as shape recognition, edge extraction, or brightness analysis of the subject. The predetermined direction of the dividing line L1 is preset to, for example, a horizontal direction or the like in the through image G1 (or the incident surface 50). The predetermined direction is not limited to the horizontal direction, and may be a vertical direction or various directions between both directions. Further, the dividing line L1 is not limited to a straight line, and may be a curved line that is partially or entirely bent or curved.

In a state where the live view screen as illustrated in FIG. 7A is displayed (S13), for example, the controller 180 receives a user operation for changing or determining the position or the like of the dividing line L1 in the user interface 210 (S14). Such a user operation is preset to, for example, a touch operation on the live view screen, or a pressing operation of a predetermined button, or the like. In step S14, a user operation for changing not only the position of the dividing line L1, but also the direction or the shape of the dividing line L1, may be inputted.

In a case where a change operation for changing the dividing line L1 is inputted (YES in S14), the controller 180 changes the position of the dividing line L1 and again performs the processing of step S13 and subsequent steps, in response to the inputted user operation. For example, the user is able to input a change operation for moving the position of the dividing line L1 up and down in the example of FIG. 7A, and then input a determination operation in a state of being in a desired position.

In a case where a determination operation is inputted instead of the change operation for changing the dividing line L1 (NO in S14), for example, the controller 180 determines a filter-corresponding region according to the dividing line L1 being displayed, and detects the transmittance with which the overexposure can be eliminated in the filter-corresponding region (S15). The processing in step S15 will be described using FIGS. 7A and 7B.

Figure 7C:
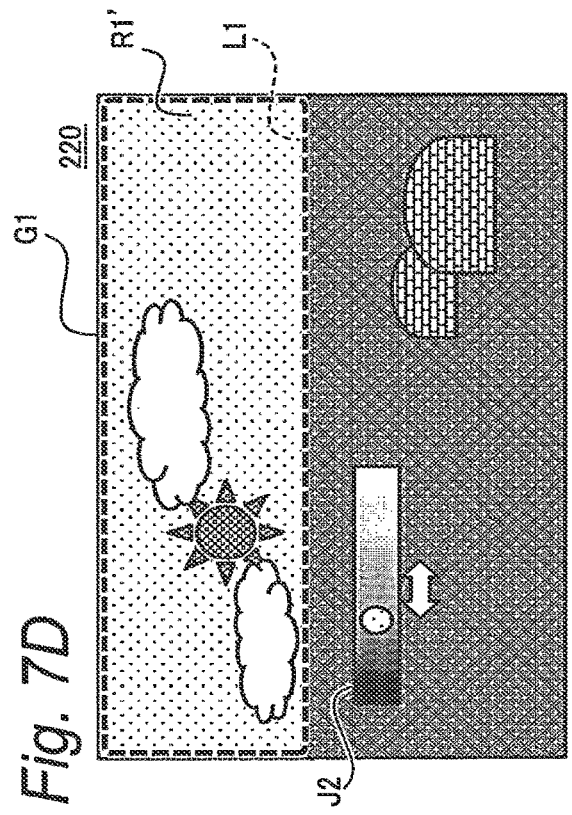
Figure 7B:
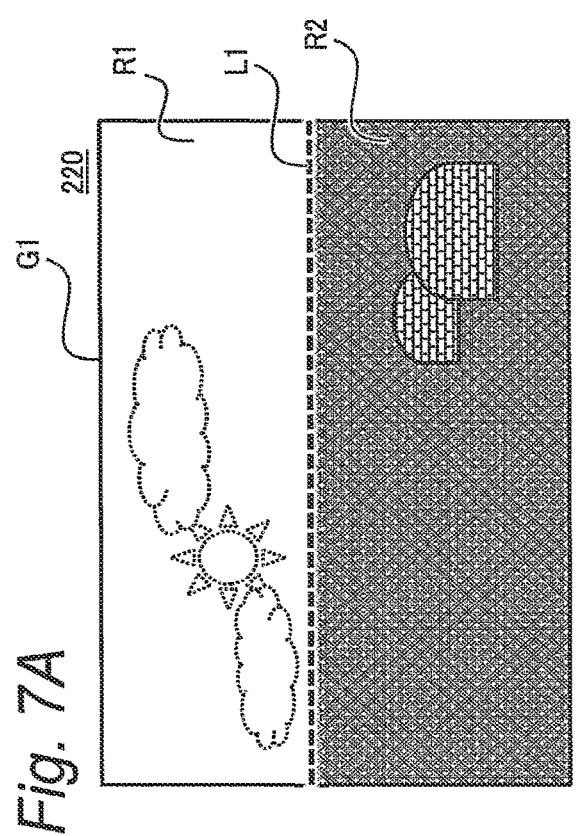

FIG. 7B illustrates a filter-corresponding region R10 corresponding to the dividing line L1 of FIG. 7A. In step S15, the controller 180 determines, as the filter-corresponding region R10, a region corresponding to the bright region R1 on the incident surface 50 of the electronic ND filter 150 based on, for example, the dividing line L1 in the through image G1 and the brightness of the two regions R1 and R2 divided by the dividing line L1. Furthermore, for example, the controller 180 detects the transmittance of the filter-corresponding region R10 such that the luminance of the brightest pixel in the bright region R1 corresponding to the determined filter-corresponding region R10 is the upper limit value "255" or less (S15).

For example, in step S15, the controller 180 repeats the detection of the presence or absence of blown-out highlights in the bright region R1 in the through image G1 to be newly captured while gradually decreasing the transmittance of the filter-corresponding region R10. Alternatively, the controller 180 may first sufficiently reduce the transmittance of the filter-corresponding region R10 to the extent that blown-out highlights are assumed to be eliminated in the bright region R1, then detect the pixel having the highest luminance in the bright region R1 and the luminance thereof, and calculate the transmittance at which the luminance of the pixel is near the upper limit value.

Figure 7D:
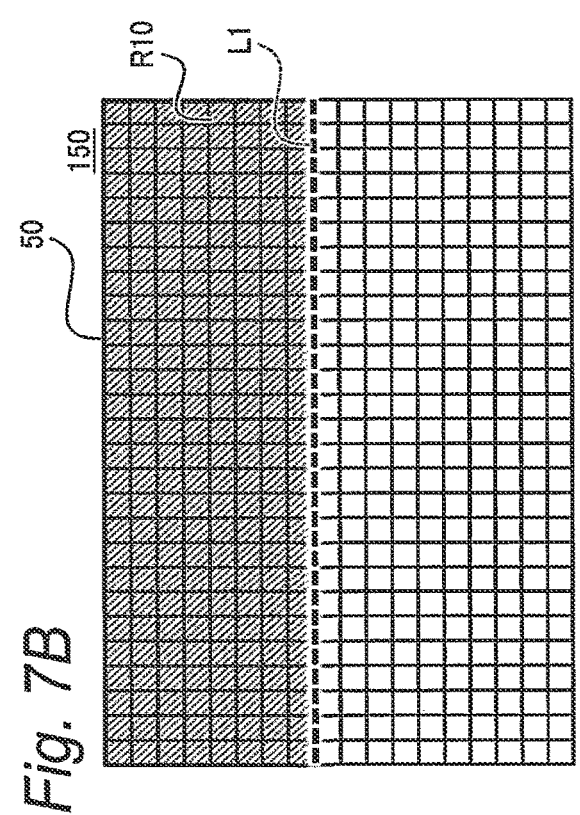

For example, the controller 180 controls the electronic ND filter 150 so as to set the detected transmittance to the filter-corresponding region R10, and causes the display monitor 220 to display the through image G1 of the imaging result of the image sensor 140 in a state where the transmittance setting is reflected (S16). At this time, the controller 180 receives, for example, a user operation for changing or determining the transmittance set for the filter-corresponding region R10 in the user interface 210 (S17). The display example in step S17 is illustrated in FIGS. 7C and 7D.

FIG. 7C illustrates a display screen that receives a transmittance change operation (S17) after a region R1' on the through image G1 is determined as a target for transmittance adjustment, in response to a determination operation (S14) by the user in the example of FIG. 7A. In the example of FIG. 7C, the controller 180 causes the through image G1 in a state in which the transmittance of the filter-corresponding region R10 (FIG. 7B) of the electronic ND filter 150 corresponding to the region R1' is adjusted to 80%, and an indicator J1 of the transmittance for the region R1' to be displayed on a display monitor 230.

While such a display screen (FIG. 7C) is being displayed, a user operation received in step S17 by the user interface 210 of the digital camera 100 is preset in a predetermined touch operation; or a direction-key and/or dialing operation, an enter button operation, or the like. For example, the user is able to use a physical dial to increase or decrease the transmittance to operate the region R1' determined in step S14 in a direction of increasing or decreasing the transmittance, or by performing a touch operation with respect to the indicator J1 or the like.

Furthermore, in the digital camera 100 according to the present embodiment, the user interface that receives such a user operation is not particularly limited to the above example, and various user interfaces can be used. For example, the transmittance may be increased or decreased by a touch operation by the user with respect to a bar J2 (FIG. 7D), which indicates the gradation of the transmittance, instead of the indicator J1. Furthermore, in a case where the transmittance is further partially increased or decreased with respect to the region R1' determined in step S14, the user may point to a predetermined region in the determined region R1' by means of a touch operation or a joystick operation on the display screen, and then use a dial to operate in a direction of increasing or decreasing the transmittance. The point at which the foregoing region is instructed by the user is desirably displayed on the display screen.

Returning to FIG. 6, in a case where a transmittance change operation is inputted (YES in S17), the controller 180 changes the transmittance of the filter-corresponding region R10 in response to the inputted user operation, and again performs the processing of step S16 and subsequent steps. The user is able to input a transmittance change operation or a transmittance determination operation while checking the through image G1 reflecting the transmittance that has been set on the live view screen.

In a case where a determination operation is inputted instead of a transmittance change operation (NO in S17), the controller 180 ends the half-mode filter adjustment processing (S5) with the current state of the electronic ND filter 150 serving as the adjustment result, for example, and proceeds to step S8 of FIG. 4.

According to the above filter adjustment processing (S11 to S17), the transmittance of the electronic ND filter 150 for each region can be adjusted so as to reduce the contrast between the two regions R1 and R2 in the two-division composition assumed in half mode.

FIG. 7B illustrates the setting of the transmittance in a case where the gradation necessity (S2 in FIG. 4) is OFF. In this case, in the filter-corresponding region R10 of the electronic ND filter 150, the transmittance is reduced from the initial value "100%", whereas the outside of the filter-corresponding region R10 is maintained at the initial value. However, in a case where the gradation necessity is ON, for example, the transmittance gradually increases from the filter-corresponding region R10 of the electronic ND filter 150 toward the outside, and is set to continuously reach the initial value.

In the above description, an example in which one dividing line L1 is recognized has been described, but the digital camera 100 may recognize a plurality of dividing lines. For example, the controller 180 may recognize two dividing lines in a three-division composition, and may set one of the centers or the like of the three regions as an adjustment target of the electronic ND filter 150. Furthermore, the number of filter-corresponding regions in which the transmittance of the electronic ND filter 150 is adjusted is not limited to one, and a plurality of filter-corresponding regions may be set.

(2) Frame Composition Mode

Figure 8:
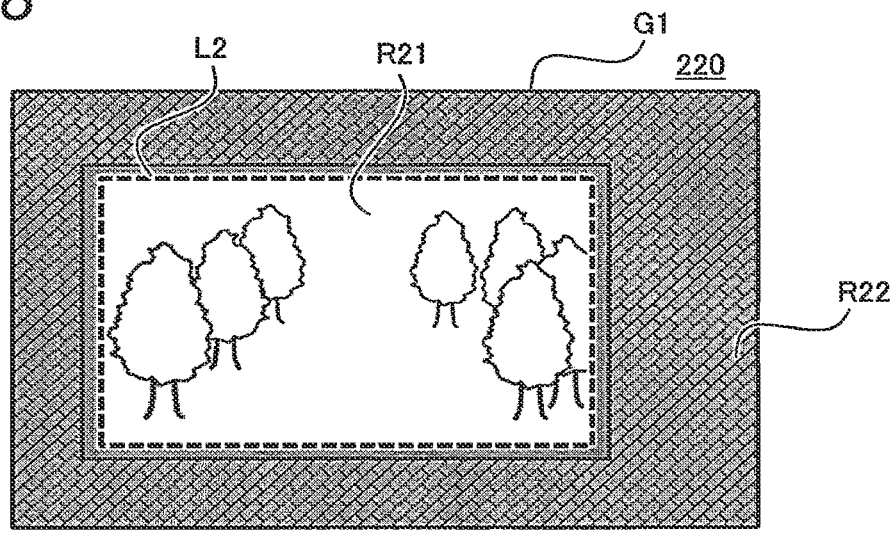
FIG. 8 is a diagram showing a display example of a frame composition mode of the digital camera.

FIG. 8 shows a display example of a frame composition mode of the digital camera 100. For example, as shown in FIG. 8, the frame composition mode is an adjustment mode in which the electronic ND filter 150 is used so as to reduce the contrast assumed in a composition, that is, a frame composition, in which part of the entire image is surrounded.

For example, in the example of FIG. 8, an outdoor landscape is surrounded by an indoor window frame, and a bright region R21 inside an enclosing frame L2 and a dark region R22 outside same are generated. In such a frame composition, there is a risk that an outdoor landscape in the bright region R21 in the enclosing frame L2 may have blown-out highlights or that an indoor wall surface or the like in the dark region R22 may exhibit black crush. Therefore, in a case where the frame composition mode is set ((i) in S11), the controller 180 recognizes the enclosing frame L2 defining the bright region R21 and the dark region R22, as described earlier, for example (S18).

For example, in step S18, the controller 180 recognizes the enclosing frame L2 by detecting a predetermined shape such as a rectangle, a triangle, a polygon, or a circle, through image recognition of the through image G1. The controller 180 is capable of detecting the inner and outer regions R21 and R22 by recognizing the enclosing frame L2 (S18). The portion corresponding to the enclosing frame L2 in the subject does not necessarily have a closed frame shape. The controller 180 may recognize the enclosing frame L2 by appropriately interpolating on the through image G1, for example. The enclosing frame L2 may partially include the edge portion of the entire image. Further, in step S18, the controller 180 may detect not only one enclosing frame L2 but also a plurality of enclosing frames.

For example, as shown in FIG. 8, the controller 180 causes the display monitor 220 to display the recognized enclosing frame L2 (S19), and receives a user operation for changing or determining the enclosing frame L2 in the user interface 210 (S20). In the change operation of the enclosing frame L2, for example, the size, shape, position, and the like of the enclosing frame L2 can be changed.

In a case where a change operation for changing the enclosing frame L2 is inputted (YES in S20), the controller 180 changes the position and the like of the enclosing frame L2 and again performs the processing of step S19 and subsequent steps, in response to the inputted user operation. However, in a case where a determination operation is inputted instead of the change operation of the enclosing frame L2 (NO in S20), the controller 180 performs the processing of step S15 and subsequent steps with respect to the filter-corresponding region corresponding to the bright region R21 in the enclosing frame L2 being displayed, for example. As a result, the digital camera 100 detects the transmittance for eliminating overexposure of the bright region R21 in the enclosing frame L2, for example (S15).

As described above, according to the filter adjustment processing (S18 to S20, S15 to S17) of the frame composition mode, the brightness in image shooting can be easily adjusted to reduce the contrast assumed in the frame composition. For example, in the example of FIG. 8, it is possible to vividly project an outdoor scene while avoiding overexposure in the bright region R21 in the enclosing frame L2 and vividly project an indoor wall surface while avoiding overexposure in the dark region R22 outside the enclosing frame L2.

In the above description, an example of changing the transmittance of the filter-corresponding region inside the enclosing frame L2 has been described, but the frame composition mode is not particularly limited thereto. For example, in a case where the outside of the enclosing frame L2 is brighter than the inside and overexposure occurs, the controller 180 is able to determine the filter-corresponding region of the outside region of the enclosing frame L2 in step S15, and perform adjustment to reduce the transmittance of the electronic ND filter 150 in step S16 and subsequent steps.

(3) Zebra Mode

Figure 9:
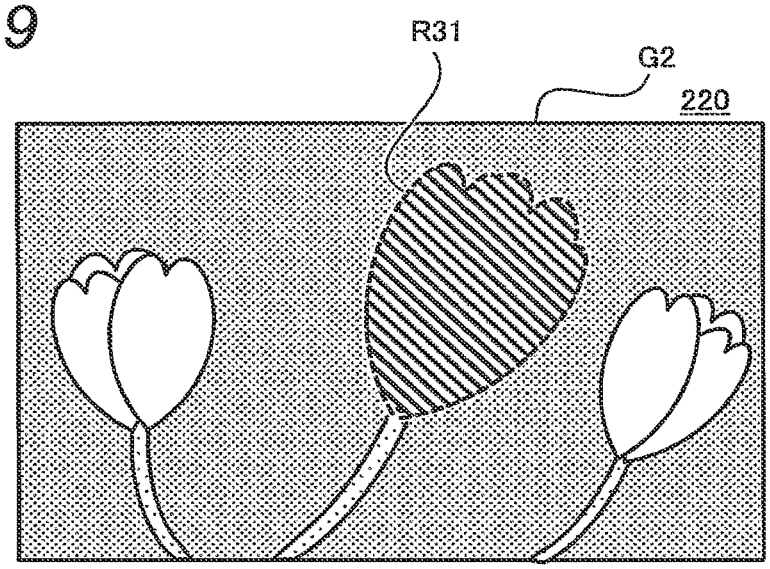
FIG. 9 is a diagram showing a display example of a zebra mode of the digital camera.

FIG. 9 shows a display example of a zebra mode of the digital camera 100. Zebra mode is an adjustment mode in which a region having a predetermined luminance level corresponding to blown-out highlights or the like is detected and used for the electronic ND filter 150, similarly to a so-called zebra display function.

In a case where the adjustment mode set in the digital camera 100 is zebra mode ((iii) in S21), the controller 180 detects a bright region R31 in which the luminance is at a predetermined level, based on the luminance of each pixel in the through image G1, for example (S21), and causes the display monitor 220 to display the bright region R31 (S22). The predetermined level is, for example, an upper limit value "255" for luminance on the image. The predetermined level for the luminance is not particularly limited to the foregoing value, and may be set to a predetermined range of the upper limit value or less.

In the example of FIG. 9, the display monitor 220 displays a zebra pattern in the detected bright region R31, similarly to the so-called zebra display function. The controller 180 in the zebra mode displays a zebra pattern in a region having a predetermined luminance level on the live view screen, similarly to the so-called zebra display function. In addition to this zebra pattern, the controller 180 may display a boundary line or the like for identifying the bright region R31 in the detection results of step S21 (S22).

The controller 180 performs the processing of step S15 and subsequent steps with respect to the filter-corresponding region corresponding to the detected bright region R31, for example. As a result, the transmittance to the bright region R31 detected in step S21 is changed (S15). At this time, the digital camera 100 can update, as needed, the zebra display on the live view screen captured thereafter. Thus, when the luminance becomes lower than a predetermined level by controlling the transmittance, for example, the zebra pattern is not displayed.

As described above, according to the filter adjustment processing (S21 to S22, and S15 to S17) of the zebra mode, the transmittance of the region where the luminance is at the predetermined level is selectively reduced, and the adjustment to eliminate the overexposure can be easily performed.

In the above description, an example in which one bright region R31 is detected has been described, but the zebra mode is not limited thereto. For example, the controller 180 may detect, based on a predetermined level of luminance, a plurality of partial regions. Further, a plurality of predetermined levels of luminance may be set, and region detection according to each level can be executed. Further, the transmittance in such a case may be set separately for each region, or may be performed collectively.

(4) Color Zebra Mode

Color zebra mode is an adjustment mode in which color values are set as a detection target instead of the luminance set as a detection target in the zebra mode, and the adjustment of the electronic ND filter 150 is performed similarly to the zebra mode.

When the adjustment mode set in the digital camera 100 is the color zebra mode ((iv) in S21), the controller 180 detects a bright region in which the color values of a specific color are at a predetermined level in the through image G1, for example, instead of step S21 in the zebra mode (S23). The specific color is, for example, a color that is preset as an RGB color. The predetermined level can be set similarly to the zebra mode, for example.

Based on the detection results of a bright region of a specific color, the controller 180 performs the processing of step S22 and subsequent steps, similarly to zebra mode. According to the filter adjustment processing (S23, S22, and S15 to S17) of this color zebra mode, for example, image shooting in which color saturation is suppressed can easily be realized using the electronic ND filter 150 for a saturation state of a specific color such as red blown-out highlights instead of white blown-out highlights.

Various semi-auto modes as described above may be used in combination, as appropriate. For example, the controller 180 may simultaneously perform the region detection based on the luminance in the zebra mode and the region detection based on the color values in the color zebra mode. By adjusting the transmittance for each detected region, blown-out highlights and color saturation can be simultaneously suppressed, for example.

2-2-2. Manual Filter Adjustment Processing

Figure 10:
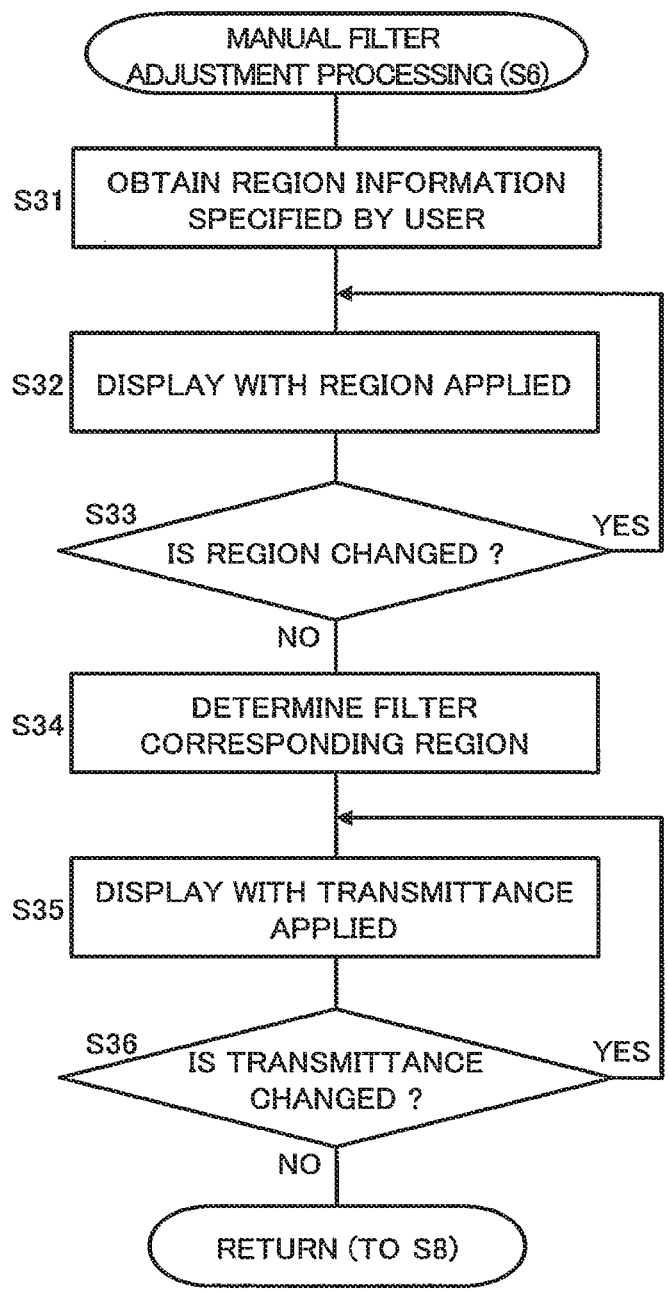
FIG. 10 is a flowchart illustrating manual filter adjustment processing of the digital camera.

In the digital camera 100 according to the present embodiment, the electronic ND filter 150 may be adjusted without performing various automatic detection as per the foregoing semi-auto mode in particular. Details of the manual filter adjustment processing in step S6 of FIG. 4 will be described using FIG. 10.

For example, the controller 180 first receives, in the user interface 210, an operation for designating a region for which transmittance adjustment is desired by the user on the live view screen displayed in step S3 of FIG. 4, and acquires user-designated region information (S31). For example, the user-designated region information includes the position, shape, number, and the like of partial regions on the through image G1 designated by a user operation.

Next, the controller 180 performs display control in which a partial region is made visible to a user operation on the live view screen of the display monitor 220, based on the acquired user-designated region information (S32). In step S32, the controller 180 may highlight the region designated on the live view screen, or may change the transmittance of the filter-corresponding region of the designated partial region to a predetermined value (for example, a minimum value) in the electronic ND filter 150.

In the above display state, the controller 180 receives a user operation for changing or determining the partial region (S33). In a case where a partial region change operation is inputted (YES in S33), the controller 180 changes the partial region in response to the inputted user operation and again performs the processing of step S32 and subsequent steps. However, when an operation for determining a partial region is inputted (NO in S33), the controller 180 determines a filter-corresponding region, corresponding to the partial region being displayed, on the incident surface 50 of the electronic ND filter 150, for example (S34). Here, the partial region can be changed by the user pointing to a predetermined region by means of a touch operation or a joystick operation on the display screen. At the time of such partial region setting, the digital camera 100 may implement a screen display for enlarging the predetermined region in response to the user operation, for example.

Further, the controller 180 performs processing to adjust the transmittance of the filter-corresponding region in response to the user operation, for example, similarly to steps S16 and S17 of the semi-auto filter adjustment processing (FIG. 6) (S35, S36). For example, in a state (S35) in which the current transmittance in the determined filter-corresponding region is reflected on the display of the live view screen, the controller 180 receives a user operation for changing or determining the transmittance in the user interface 210 (S36). Here, the transmittance can be increased or decreased by the user using a dial to operate the determined filter-corresponding region in a direction of increasing or decreasing the transmittance.

In a case where a transmittance change operation is inputted (YES in S36), the controller 180 changes the transmittance of the filter-corresponding region in response to the inputted user operation, and again performs the processing of step S35 and subsequent steps. However, in a case where a transmittance determination operation is inputted (NO in S36), the controller 180 ends the manual filter adjustment processing (S6) with the current state of the electronic ND filter 150 serving as the adjustment result, for example, and proceeds to step S8 of FIG. 4.

According to the above manual filter adjustment processing (S31 to S36), the digital camera 100 is capable of adjusting the filter-corresponding region in the electronic ND filter 150 and the transmittance thereof according to user operation.

2-2-3. Full-Auto Filter Adjustment Processing

The digital camera 100 according to the present embodiment may automatically adjust the electronic ND filter 150 without any particular user operation. Details of the full-auto filter adjustment processing in step S7 of FIG. 4 will be described using FIGS. 11 to 13.

FIGS. 11A to 11F are diagrams to describe the full-auto mode of the digital camera 100 according to the present embodiment.

Figure 11A:
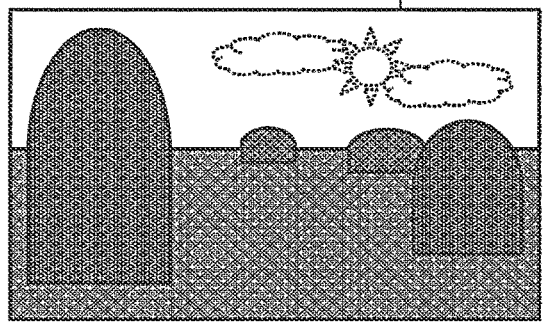
FIGS. 11A to 11F are diagrams to describe a full-auto mode of the digital camera.
Figure 11B:
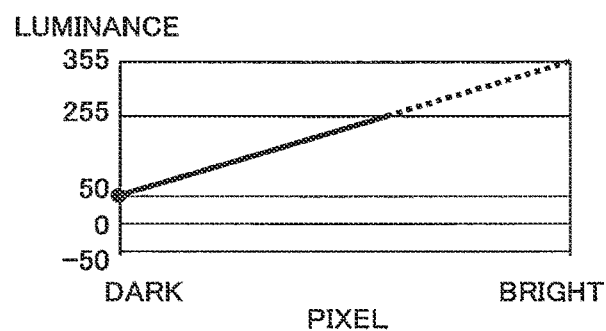

FIG. 11A illustrates the through image G1 before adjustment in the full auto mode. FIG. 11B illustrates the correspondence relationship between luminance and pixels in the through image G1 of FIG. 11A. The vertical axis in FIG. 11B represents luminance, and the horizontal axis corresponds to pixels. The left side in the drawing corresponds to darker pixels, and the right side corresponds to brighter pixels (the same applies to FIGS. 11D and 11F).

FIGS. 11A and 11B illustrate a state in which the transmittance of the electronic ND filter 150 is set to the maximum value "100%" as the initial value. In the through image G1 of FIG. 11A, blown-out highlights occur due to the excessively bright background. Accordingly, in the graph of FIG. 11B, a state in which the luminance of the corresponding pixel potentially exceeds the upper limit value "255" is illustrated by a broken line.

Figure 11C:
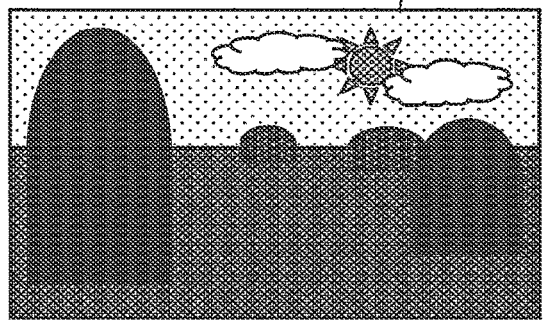
Figure 11D:
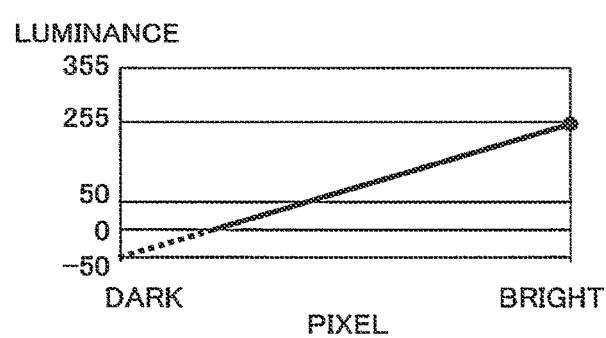

FIGS. 11C and 11D illustrate states in which the transmittance of the electronic ND filter 150 is reduced across the entire image from the states of FIGS. 11A and 11B. For example, in conventional technology such as an electronic ND filter having exposure setting or uniform full-screen control, when adjustment is performed to eliminate blown-out highlights in the states of FIGS. 11A and 11B, black crush occurs similarly to FIG. 11C. Accordingly, in the graph of FIG. 11D, a state in which the luminance of the corresponding pixel is potentially below the lower limit value "0" is illustrated by a broken line.

The blown-out highlights and black crush as described above are not limited to specific regions on the image, and may be scattered in various positions. Therefore, the digital camera 100 according to the present embodiment adjusts the transmittance of the electronic ND filter 150 according to the brightness of each pixel (that is, the light amount on the incident surface 50) in order to automatically eliminate both blown-out highlights and black crush as described above in the full-auto mode. The adjustment results of the full-auto mode with respect to the examples of FIGS. 11A to 11D are illustrated in FIGS. 11E and 11F.

Figure 11E:
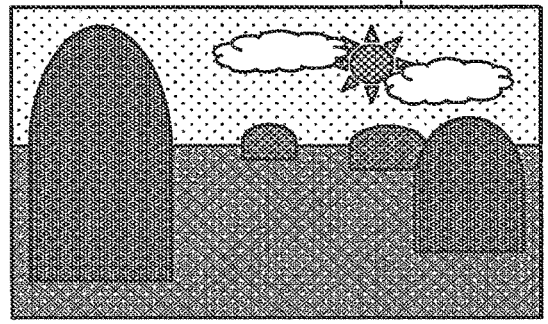
Figure 11F:
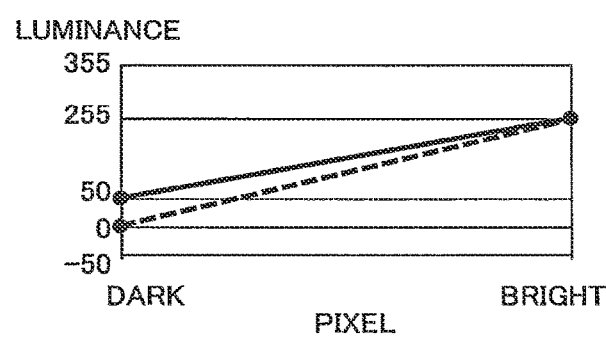
Figure 12:
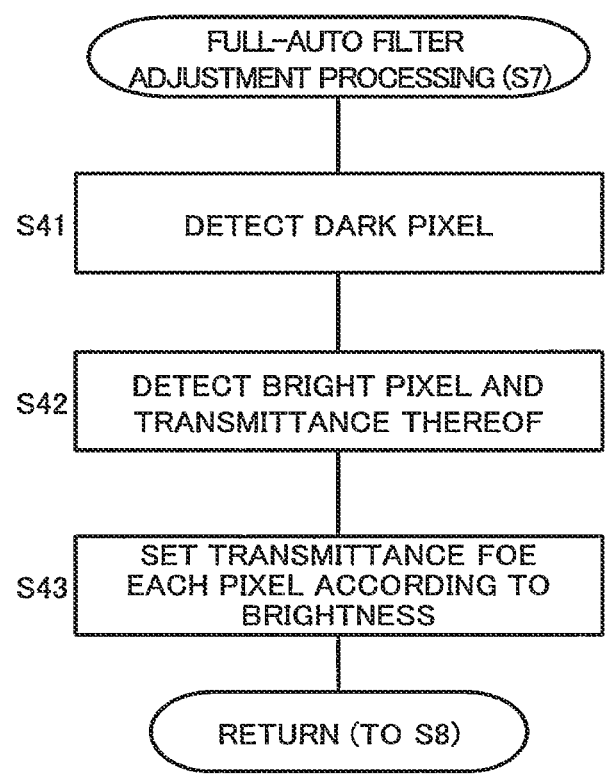
FIG. 12 is a flowchart illustrating full-auto filter adjustment processing of the digital camera.

In the examples of FIGS. 11E and 11F, the contrast between the brightest pixel and the darkest pixel is reduced by the full-auto filter adjustment processing (S7 in FIG. 4) in the digital camera 100 according to the present embodiment, and the blown-out highlights and the black crush in FIGS. 11A to 11D can be eliminated. Such an operation in the full-auto mode can be performed without setting the necessity of gradation in particular (S2 in FIG. 4). FIG. 12 is a flowchart illustrating full-auto filter adjustment processing (S7) of the digital camera 100.

First, for example, as shown in FIGS. 11A and 11B, in a state where the transmittance of the electronic ND filter 150 is the initial value (100%), the controller 180 detects the darkest pixel and the luminance thereof on the through image G1 (S41).

Furthermore, for example, in step S41, the controller 180 acquires the luminance values of each pixel in which blown-out highlights have not occurred in FIG. 11A and which are less than the upper limit value "255" in FIG. 11B, and manages the pixel and each luminance value in association with each other. Further, the controller 180 may specify a pixel with blown-out highlights for which the luminance is the upper limit value "255". Such pixel management may be performed collectively for a plurality of pixels corresponding to one pixel 51 of the electronic ND filter 150.

Next, the controller 180 reduces the transmittance of the electronic ND filter 150, for example, as illustrated in FIGS. 11C and 11D, and detects the transmittance at which the luminance of the brightest pixel becomes the upper limit value "255" (S42).

For example, in step S42, the controller 180 acquires the luminance value of each pixel in the state of FIG. 11D for the pixel group including each pixel with blown-out highlights in FIG. 11B, and adds the acquired luminance value to the managed correspondence relationship in step S41. As a result, for example, the correspondence relationships between each pixel and the luminance values across all the images can be managed up to the range of the broken line portion in addition to the solid line portion in FIG. 11B. The luminance value for each pixel 51 managed in this manner is caused by the amount of light incident on the incident surface 50 of the electronic ND filter 150.

Next, the controller 180 sets the transmittance of each pixel 51 of the electronic ND filter 150 in a distribution in which the transmittance is assigned in proportion to the magnitude of the luminance value, for example, based on the various information obtained in steps S41 and S42 (S43). The processing in step S43 will be described using FIG. 13.

Figure 13:
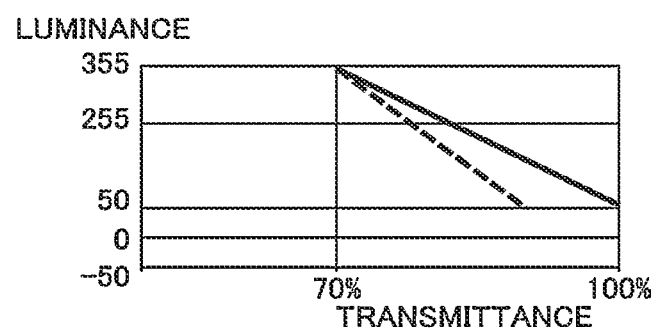
FIG. 13 is a diagram to describe the transmittance distribution of the electronic ND filter in the full-auto mode.

FIG. 13 is a diagram to describe the transmittance distribution of the electronic ND filter 150 in the full-auto mode. The vertical axis in FIG. 13 represents the luminance value of each pixel similarly to FIG. 11B, and the horizontal axis represents the transmittance of the electronic ND filter 150.

In step S43, for example, as illustrated in FIG. 13, the controller 180 calculates a correspondence relationship between each luminance value in a range from the luminance value "355" of the brightest pixel to the darkest pixel "50", and the transmittance. In the example of FIG. 13, the transmittance detected in step S42 is associated with the highest luminance value "355", and the transmittance is set to increase linearly with respect to a decrease in the corresponding luminance value. Further, in the setting indicated by the solid line in FIG. 13, the lowest luminance value "50" is associated with the maximum value "100%" of the transmittance.

Based on the correspondence relationship between the transmittance and the luminance values (FIG. 13) as described above and the correspondence relationship between the luminance values and the pixels (see FIG. 11B) managed in steps S41 to S42, for example, the controller 180 assigns the transmittance corresponding to each luminance value in FIG. 13 to the pixels 51 corresponding to the luminance values (S43).

By adjusting the transmittance of the electronic ND filter 150 as described above (S43), the controller 180 ends the filter adjustment processing (S7) of the full-auto mode, and proceeds to step S8 of FIG. 4, for example.

According to the above filter adjustment processing (S41 to 43) in the full-auto mode, the digital camera 100 is capable of automatically adjusting the transmittance of each pixel 51 of the electronic ND filter 150 in consideration of the amount of light incident on each pixel in the shooting scene from the luminance of the through image G1.

As a result, for example, in the example of FIG. 11B, the transmittance is set relatively low for the pixel exceeding the upper limit value "255" (FIG. 13), and as shown in FIG. 11F, the luminance of the pixel can be suppressed to the upper limit value or less to eliminate blown-out highlights (FIGS. 11A and 11E). Furthermore, for example, in the example of FIG. 11D, the transmittance is set relatively high for a pixel falling below the lower limit value "0", and as shown in FIG. 11F, the luminance of the pixel can be set to the lower limit value or more, and black crush can be avoided (FIGS. 11C and 11E).

In the above description, an example of the transmittance distribution in step S43 was described. The transmittance distribution in step S43 is not limited to the above example, and various distributions are possible. For example, as indicated by the broken line in FIG. 13, the transmittance corresponding to the lowest luminance value may be less than the maximum value. For example, as indicated by the broken line in FIG. 11F, the transmittance corresponding to the lowest luminance value may be set so as to reduce the luminance of the darkest pixel to the lower limit value "0".

As a result, brightness adjustment which uses a wider dynamic range of the digital camera 100 can be realized.

3. Summary

As described above, the digital camera 100, which is an example of the imaging apparatus according to the present embodiment, includes the image sensor 140 as an example of an image sensor, the controller 180, the card slot 190 as an example of a recorder, and the electronic ND filter 150 as an example of an adjuster. The image sensor 140 captures a subject image by receiving incident light and generates image data. The controller 180 controls an image shooting operation using the image sensor 140. The card slot 190 records the image data resulting from the image shooting operation, to the memory card 200, which serves as an example of a recording medium. The electronic ND filter 150 adjusts the transmittance of an example of the light reception rate at which the image sensor 140 receives light in each position on the incident surface 50 whereon the light is incident, in response to the image represented by the image data. The controller 180 controls the electronic ND filter 150 so that the light reception rate in a position corresponding to part of the image on the incident surface 50 is different from the light reception rates in other positions (S5 to S7). In an image shooting operation, the controller 180 causes the image sensor 140 to capture an image in a state where the light reception rate is rendered different by the electronic ND filter 150, and causes the card slot 190 to record image data representing the image (S8).

The digital camera 100 described above enables an image shooting operation to be performed in an adjustment state in which the transmittance is partially changed by the electronic ND filter 150, and enables brightness in the image that has been shot to be easily adjusted.

In the digital camera 100 according to the present embodiment, the controller 180 detects a partial region (for example, a bright region R11) having excess or deficiency of exposure in the through image G1 as an example of the captured image captured by the image sensor 140 (S12), and controls the electronic ND filter 150 to adjust the light reception rate in a position corresponding to the partial region on the incident surface 50 (S15 to S17). As a result, excess or deficiency of exposure can be suppressed using the electronic ND filter 150, and brightness adjustment in image shooting can be easily performed.

The digital camera 100 according to the present embodiment further includes a user interface 210 that enables a user operation to be inputted with respect to a live view screen as an example of an operation screen for displaying the through image G1. The controller 180 displays the detected partial region on the operation screen, and receives, in the user interface, a user operation for changing at least one of the partial region or the light reception rate of the partial region (S13 to S17). As a result, the detection results of the digital camera 100 are presented to the user to prompt fine-adjustment, and brightness adjustment using the electronic ND filter 150 can be easily performed. The user operation may be to change only one of the partial region and the light reception rate.

In the digital camera 100 according to the present embodiment, the controller 180 detects the light reception rate at which the excess or deficiency of exposure in the partial region is eliminated (S15). As a result, the light reception rate enabling the excess or deficiency of exposure to be eliminated is automatically detected, and brightness adjustment using the electronic ND filter 150 can be easily performed.

In the digital camera 100 according to the present embodiment, the controller 180 recognizes the dividing line L1 that divides the through image G1 into the plurality of regions R1 and R2, and detects a partial region such as the bright region R1 from the plurality of divided regions R1 and R2. As a result, when the user wants to shoot a two-division composition or the like, the digital camera 100 is capable of detecting a partial region whose transmittance can be adjusted according to the composition, and brightness adjustment in image shooting can be easily performed.

In the digital camera 100 according to the present embodiment, the controller 180 recognizes the frame shape L2 surrounding the partial region R11 in the through image G1, and detects the inside or the outside of the frame shape as the partial regions R11 and R12 (S18). As a result, when the user uses the frame composition and so forth, the digital camera 100 is capable of detecting a partial region in which the transmittance can be adjusted according to the contrast assumed in the composition, and brightness adjustment in image shooting can be easily performed.

In the digital camera 100 according to the present embodiment, the controller 180 detects, as the partial region, a region in which at least one of the luminance or the color values in the captured image is at a predetermined level (S21, S23). As a result, for example, the user can selectively reduce the light of a portion where blown-out highlights have occurred while confirming blown-out highlights as per the zebra display function, or can suppress color saturation instead of blown-out highlights, thus enabling easy adjustment of various kinds of brightness in image shooting.

In the digital camera 100 according to the present embodiment, the controller 180 sets a partial region where the light reception rate is adjusted (S2), and controls the electronic ND filter 150 so that the light reception rate gradually changes between the inside and the outside of the set partial region. Through such gradation setting, when the transmittance is partially changed using the electronic ND filter 150, the boundary portion can be easily afforded a natural impression.

The digital camera 100 according to the present embodiment further includes a user interface 210 that enables a user operation for designating a partial region in the through image G1 and a light reception rate in the partial region to be inputted on an operation screen for displaying the through image G1 captured by the image sensor 140. The controller 180 controls the electronic ND filter 150 to adjust the light reception rate in a position corresponding to the partial region on the incident surface in response to the user operation inputted to the user interface (S31 to S36). As a result, particularly in the manual mode in which automatic adjustment of the digital camera 100 is not used, the adjustment desired by the user can be performed, and brightness adjustment can be easily performed.

In the digital camera 100 according to the present embodiment, the controller 180 controls the electronic ND filter 150 in each position so as to reduce the light reception rate as the light amount in each position increases, according to the light amount of light incident in each position on the incident surface 50 (S43). As a result, the digital camera 100 is capable of automatically setting the transmittance according to the brightness of each portion in the shooting circumstances, thus enabling easy adjustment of brightness in image shooting.

In the digital camera 100 according to the present embodiment, the adjuster includes the electronic ND filter 150 that adjusts the transmittance of the incident light as the light reception rate in each position on the incident surface 50. As a result, easy adjustment of brightness in image shooting can be performed using the electronic ND filter 150 in region control.

Other Embodiments

As described above, the first embodiment has been described as an example of the technology disclosed in the present application. However, the technology of the present disclosure is not limited thereto, and can also be applied to embodiments in which changes, substitutions, additions, omissions, and the like are made as appropriate. Moreover, it is also possible to combine each of the constituent elements described in the above embodiments to form a new embodiment.

In the above first embodiment, an electronic ND filter 150, which is capable of adjusting the transmittance in pixel units was described. In the present embodiment, the electronic ND filter 150 may not be adjustable in pixel units, and the transmittance may be adjustable in units of rows or columns, for example. So too in this case, the digital camera 100 is capable, for example, of recognizing the dividing line along each unit direction in the half mode and of adjusting the transmittance with respect to the partial region, thus enabling adjustment in which excess or deficiency of exposure is reduced as per the above embodiment.

In each of the above embodiments, the electronic ND filter 150 has been described as an example of the adjuster, but the adjuster according to the present embodiment is not limited to the electronic ND filter 150. For example, the adjuster according to the present embodiment may be configured to adjust, as the light reception rate, sensitivity such as the quantum efficiency in the photoelectric conversion of each pixel in the image sensor 140. As such an adjuster, for example, known technology such as that of JP 2019-68402 A can be applied. In this case, the incident surface of the adjuster may coincide with the imaging surface of the image sensor, and the image sensor and the adjuster may be configured to be integral.

Furthermore, in each of the above embodiments, the operation example of adjusting the transmittance of the filter-corresponding region so as to eliminate the overexposure was described. However, the light reception rate is not particularly limited to overexposure, rather, the light reception rate may also be adjusted to eliminate underexposure. For example, the sensitivity of an underexposed region may be increased using an adjuster capable of changing pixel sensitivity. Further, in the electronic ND filter 150, the initial value may be lowered to be lower than the maximum value, and the transmittance may be increased according to the point where underexposure occurs.

Further, in each of the above embodiments, the operation example of the digital camera 100 that detects the brightness of the subject from the through image G1 was described. The digital camera 100 according to the present embodiment is not particularly limited thereto, and may, for example, include a photometric sensor separately from the image sensor 140. In the present embodiment, the photometric sensor of the digital camera 100 may be configured to be able to perform photometry independently of adjustment by the adjuster, for example. The digital camera 100 according to the present embodiment is capable of easily adjusting the light reception rate in each position on the incident surface of the adjuster by using the measurement result by the photometric sensor.

Furthermore, in each of the above embodiments, the card slot 190 is illustrated as the recorder of the digital camera 100, but the recorder is not limited thereto. In the present embodiment, the recording medium which is the recording destination for recording by the recorder is not limited to the memory card 200, and may be, for example, an external storage device such as an SSD drive. In the present embodiment, the recorder may be various interface circuits that write data from the digital camera 100 to the external storage device, or may be various communication modules that perform data transmission according to various communication standards. Such communication modules serving as the recorder may record data from the digital camera 100 to various media for external distribution.

Further, in each of the above embodiments, the display monitor 220 is illustrated as an example of the display unit. In the digital camera 100 according to the present embodiment, the display unit is not limited to the display monitor 220, and may be, for example, an electronic view finder (EVF), an output module that outputs a video signal according to the HDMI (registered trademark) standard, or the like.

Further, in each of the above embodiments, a digital camera 100 that includes the optical system 110 and the lens driver 120 is illustrated. The imaging apparatus according to the present embodiment does not need to include the optical system 110 or the lens driver 120, and may be, for example, an interchangeable lens-type camera.

Further, in each of the above embodiments, a digital camera is described as an example of the imaging apparatus, but the present disclosure is not limited thereto. The imaging apparatus of the present disclosure need only be an electronic device having an image shooting function (for example, a video camera, a smartphone, a tablet terminal, or the like).

As described above, the embodiments have been described to illustrate the technology of the present disclosure. To that end, the accompanying drawings and the detailed description are provided. Therefore, among the constituent elements disclosed in the accompanying drawings and the detailed description, not only the constituent elements which are essential for solving the problem but also the constituent elements which are non-essential in solving the problem may be included in order to illustrate the above technology.

Summary of Aspects

Various aspects according to the present disclosure are listed hereinbelow.

A first aspect according to the present disclosure is an imaging apparatus, including: an image sensor that captures a subject image by receiving incident light and that generates image data; a controller that controls an image shooting operation using the image sensor; a recorder that records the image data on a recording medium as a result of the image shooting operation; and an adjuster that adjusts a light reception rate at which the image sensor receives the light in each position on an incident surface whereon the light is incident, in response to an image represented by the image data, wherein the controller controls the adjuster so as to render the light reception rate in a position corresponding to part of the image on the incident surface different from the light reception rate in other positions, and causes the image sensor to capture an image in a state where the light reception rate has been rendered different by the adjuster in the image shooting operation, thus causing the recorder to record image data representing the image.

A second aspect is the imaging apparatus according to the first aspect, wherein the controller detects a partial region with excess or deficiency of exposure in a captured image captured by the image sensor, and controls the adjuster to adjust a light reception rate in a position corresponding to the partial region on the incident surface.

A third aspect is the imaging apparatus according to the first or second aspect, further including: a user interface that enables a user operation to be inputted with respect to an operation screen for displaying the captured image, wherein the controller causes the operation screen to display the detected partial region, and receives, in the user interface, a user operation for changing at least one of the partial region or a light reception rate of the partial region.

A fourth aspect is the imaging apparatus according to any of the first to third aspects, wherein the controller detects a light reception rate at which excess or deficiency of exposure in the partial region is eliminated.

A fifth aspect is the imaging apparatus according to any of the first to fourth aspects, wherein the controller recognizes a dividing line that divides the captured image into a plurality of regions, and detects the partial region from the plurality of divided regions.

A sixth aspect is the imaging apparatus according to any of the first to fifth aspects, wherein the controller recognizes a frame shape surrounding a partial region in the captured image and detects the inside or the outside of the frame shape as the partial region.

A seventh aspect is the imaging apparatus according to any of the first to sixth aspects, wherein the controller detects, as the partial region, a region in which at least one of the luminance or the color values in the captured image is at a predetermined level.

An eighth aspect is the imaging apparatus according to any of the first to seventh aspects, wherein the controller sets a partial region where the light reception rate is adjusted, and controls the adjuster so that the light reception rate gradually changes between the inside and the outside of the set partial region.

A ninth aspect is the imaging apparatus according to any of the first to eighth aspects, further including: a user interface that enables a user operation for designating a partial region in the captured image and a light reception rate in the partial region to be inputted on an operation screen for displaying the captured image captured by the image sensor, wherein the controller controls the adjuster to adjust the light reception rate in a position corresponding to the partial region on the incident surface in response to the user operation inputted to the user interface.

A tenth aspect is the imaging apparatus according to any of the first to ninth aspects, wherein the controller controls the adjuster for each position so as to reduce the light reception rate as the light amount in each position increases, according to the light amount of light incident in each position on the incident surface.

An eleventh aspect is the imaging apparatus according to any of the first to tenth aspects, wherein the adjuster includes an electronic neutral density filter that adjusts the transmittance of the incident light as the light reception rate in each position on the incident surface.

The concept of the present disclosure can be applied to electronic devices (an imaging apparatus such as a digital camera, a camcorder, or a box camera, or a mobile phone, a smartphone, or the like) that have an imaging function.

The invention claimed is:
1. An imaging apparatus, comprising:
an image sensor that captures a subject image by receiving incident light, to generate image data;

a controller that controls an image shooting operation using the image sensor;

a recorder that records the image data on a recording medium as a result of the image shooting operation; and an adjuster that adjusts a light reception rate in each position on an incident surface, the light reception rate allowing the image sensor to receive the light, the incident surface being entered by the light corresponding to an image represented by the image data, wherein the controller controls the adjuster to render the light reception rate in a position corresponding to part of the image on the incident surface different from the light reception rate in another position thereon, and causes the image sensor to capture the image with the light reception rate being rendered different by the adjuster in the image shooting operation, thus causing the recorder to record image data representing the image.

2. The imaging apparatus according to claim 1,
wherein the controller detects a partial region in a captured image by the image sensor, the partial region having excess or deficiency of exposure, and controls the adjuster to adjust the light reception rate in a position corresponding to the partial region on the incident surface.

3. The imaging apparatus according to claim 2, further comprising:

a user interface that is capable of inputting a user operation with respect to an operation screen for displaying the captured image, wherein the controller causes the operation screen to display the detected partial region, and enables the user interface to input the user operation for changing at least one of the partial region or the light reception rate of the partial region.

4. The imaging apparatus according to claim 2,
wherein the controller detects a level of the light reception rate at which the excess or deficiency of exposure in the partial region is resolved.

5. The imaging apparatus according to claim 2,
wherein the controller recognizes a dividing line that divides the captured image into a plurality of regions, and detects the partial region from the plurality of divided regions.

6. The imaging apparatus according to claim 2,
wherein the controller recognizes a frame shape surrounding the partial region in the captured image and detects an inside or an outside of the frame shape as the partial region.

7. The imaging apparatus according to claim 2,
wherein the controller detects, as the partial region, a region in which at least one of a luminance or color values in the captured image is in a predetermined level.

8. The imaging apparatus according to claim 1,
wherein the controller sets a partial region where the light reception rate is adjusted, and controls the adjuster to change the light reception rate gradually between an inside and an outside of the set partial region.

9. The imaging apparatus according to claim 1, further comprising:

a user interface that is capable of inputting a user operation for designating a partial region in the captured image and a light reception rate in the partial region on an operation screen for displaying the captured image captured by the image sensor, wherein the controller controls the adjuster to adjust the light reception rate in a position corresponding to the partial region on the incident surface in response to the user operation inputted to the user interface.

10. The imaging apparatus according to claim 1,
wherein according to a light amount of light incident in each position on the incident surface, the controller controls the adjuster for each position to reduce the light reception rate as the light amount in each position increases.

11. The imaging apparatus according to claim 1,
wherein the adjuster includes an electronic neutral density filter that adjusts a transmittance of the incident light as the light reception rate in each position on the incident surface.

* * * * *